Huh et al.

(12) United States Patent

(10) Patent No.: US 9,294,345 B2
(45) Date of Patent: Mar. 22, 2016

(54) WIRELESS NETWORK MANAGEMENT PROCEDURE, STATION SUPPORTING THE PROCEDURE, AND FRAME FORMAT FOR THE PROCEDURE

(75) Inventors: Ji Young Huh, Seoul (KR); Eun Kyo Kim, Seoul (KR); Jae Young Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 12/160,767

(22) PCT Filed: Jul. 4, 2008

(86) PCT No.: PCT/KR2008/003948
§ 371 (c)(1),
(2), (4) Date: Jul. 11, 2008

(87) PCT Pub. No.: WO2009/008630
PCT Pub. Date: Jan. 15, 2009

(65) Prior Publication Data
US 2010/0169961 A1  Jul. 1, 2010

(30) Foreign Application Priority Data

Jul. 6, 2007 (KR) .................. 10-2007-0068295
Jul. 6, 2007 (KR) .................. 10-2007-0068296

(51) Int. Cl.
*G06F 15/16* (2006.01)
*H04L 12/24* (2006.01)
*H04W 24/08* (2009.01)

(52) U.S. Cl.
CPC ............. *H04L 41/069* (2013.01); *H04W 24/08* (2013.01)

(58) Field of Classification Search
CPC .......................... H04W 24/08; H04L 41/069
See application file for complete search history.

(56) References Cited

U.S. PATENT DOCUMENTS 5,220,674 A * 6/1993 Morgan et al. ................ 709/223
5,682,478 A * 10/1997 Watson et al. ................ 709/229

(Continued)

FOREIGN PATENT DOCUMENTS

CN  1871788  11/2006
EP  0528220  2/1993

(Continued)

OTHER PUBLICATIONS

Oracle, "Oracle Application Server Wireless Developers Guide 10g Release 2", Sep. 15, 2004, Entirety of Chapter 11, 19 pages.*

(Continued)

*Primary Examiner* — Krista Zele
*Assistant Examiner* — Anthony Fabbri
(74) *Attorney, Agent, or Firm* — Lee, Hong, Degerman, Kang & Waimey

(57) ABSTRACT

Provided are a WLAN management procedure, a station supporting the procedure, and a frame format for the procedure. In the management procedure, a reporting station receives a event request frame including one or more event request elements each of which comprises an event type field for specifying the event type of an event request and an event response limit field for specifying the number of requested event report elements. And, in response to the event request frame, the reporting station transmits an event response frame including event report elements for the event type specified in the event type field as many as the number specified in the event response limit field.

7 Claims, 7 Drawing Sheets

(56) References Cited

U.S. PATENT DOCUMENTS

| | | | |
|---|---|---|---|
| 5,764,887 A * | 6/1998 | Kells et al. .................. | 726/14 |
| 5,884,046 A * | 3/1999 | Antonov ..................... | 709/238 |
| 5,949,975 A * | 9/1999 | Batty et al. .................. | 709/213 |
| 5,987,514 A * | 11/1999 | Rangarajan .................. | 709/224 |
| 6,049,828 A * | 4/2000 | Dev et al. .................... | 709/224 |
| 6,154,787 A * | 11/2000 | Urevig et al. ................ | 710/8 |
| 6,167,445 A * | 12/2000 | Gai et al. ..................... | 709/223 |
| 6,310,889 B1 * | 10/2001 | Parsons et al. ............... | 370/466 |
| 6,356,955 B1 | 3/2002 | Hollberg et al. | |
| 6,452,692 B1 * | 9/2002 | Yacoub ......................... | 358/1.15 |
| 6,463,454 B1 * | 10/2002 | Lumelsky et al. ........... | 718/105 |
| 6,470,384 B1 * | 10/2002 | O'Brien et al. .............. | 709/223 |
| 6,552,813 B2 * | 4/2003 | Yacoub ......................... | 358/1.1 |
| 6,560,609 B1 | 5/2003 | Frey et al. | |
| 6,594,684 B1 * | 7/2003 | Hodjat et al. ................ | 709/202 |
| 6,654,807 B2 * | 11/2003 | Farber et al. ................. | 709/225 |
| 6,714,987 B1 * | 3/2004 | Amin et al. .................. | 709/249 |
| 6,732,117 B1 * | 5/2004 | Chilton | |
| 6,816,905 B1 * | 11/2004 | Sheets et al. ................. | 709/226 |
| 6,842,774 B1 * | 1/2005 | Piccioni ....................... | 709/207 |
| 6,909,692 B1 | 6/2005 | Sharma et al. | |
| 7,096,248 B2 * | 8/2006 | Masters et al. ............... | 709/201 |
| 7,111,060 B2 * | 9/2006 | Araujo et al. ................ | 709/224 |
| 7,161,951 B1 * | 1/2007 | Sherman ...................... | 370/447 |
| 7,181,302 B2 * | 2/2007 | Bayne .......................... | 700/96 |
| 7,299,274 B2 * | 11/2007 | Rajarajan et al. ............ | 709/223 |
| 7,330,872 B2 * | 2/2008 | Peart et al. ................... | 709/203 |
| 7,340,654 B2 * | 3/2008 | Bigagli et al. ............... | 714/47.2 |
| 7,502,726 B2 * | 3/2009 | Panasyuk et al. ............. | 703/22 |
| 7,584,274 B2 * | 9/2009 | Bond et al. ................... | 709/223 |
| 7,633,483 B2 * | 12/2009 | Ben-Schachar et al. ...... | 345/100 |
| 2001/0047406 A1 * | 11/2001 | Araujo et al. ................ | 709/223 |
| 2002/0072974 A1 * | 6/2002 | Pugliese et al. .............. | 705/14 |
| 2003/0126265 A1 * | 7/2003 | Aziz et al. .................... | 709/227 |
| 2003/0140143 A1 * | 7/2003 | Wolf et al. .................... | 709/225 |
| 2004/0039827 A1 * | 2/2004 | Thomas et al. ............... | 709/228 |
| 2004/0073621 A1 * | 4/2004 | Sampson ...................... | 709/209 |
| 2004/0103339 A1 * | 5/2004 | Chalasani et al. ............ | 714/4 |
| 2004/0120313 A1 * | 6/2004 | Moretti ................ | H04J 3/1617 370/360 |
| 2004/0167984 A1 * | 8/2004 | Herrmann ..................... | 709/229 |
| 2004/0213220 A1 * | 10/2004 | Davis ........................... | 370/389 |
| 2005/0182838 A1 * | 8/2005 | Sheets et al. ................. | 709/226 |
| 2005/0251855 A1 * | 11/2005 | Brandstatter .................. | 726/12 |
| 2005/0267974 A1 * | 12/2005 | Panasyuk et al. ............. | 709/228 |
| 2005/0286480 A1 * | 12/2005 | Akiyama ...................... | 370/338 |
| 2005/0289224 A1 * | 12/2005 | Deslippe et al. .............. | 709/208 |
| 2006/0149847 A1 * | 7/2006 | Meskauskas ....... | H04L 65/1073 709/229 |
| 2006/0195632 A1 * | 8/2006 | Bowser ........................ | 710/52 |
| 2007/0097934 A1 * | 5/2007 | Walker et al. ................ | 370/338 |
| 2007/0160038 A1 * | 7/2007 | Liu et al. ...................... | 370/389 |
| 2007/0260738 A1 * | 11/2007 | Palekar et al. ................ | 709/229 |
| 2007/0282951 A1 * | 12/2007 | Selimis et al. ................ | 709/205 |
| 2008/0034071 A1 * | 2/2008 | Wilkinson et al. ........... | 709/220 |
| 2008/0127348 A1 * | 5/2008 | Largman et al. .............. | 726/24 |
| 2008/0163171 A1 * | 7/2008 | Chess et al. .................. | 717/120 |
| 2008/0222299 A1 * | 9/2008 | Boodaei ....................... | 709/229 |
| 2009/0013285 A1 * | 1/2009 | Blyth et al. ................... | 715/816 |
| 2009/0109848 A1 * | 4/2009 | Hato et al. .................... | 370/235 |
| 2009/0175180 A1 * | 7/2009 | Yang et al. .................... | 370/252 |
| 2009/0259757 A1 * | 10/2009 | Ben-Shachar et al. ........ | 709/228 |
| 2011/0075677 A1 * | 3/2011 | Tsirinsky-Feigin .......... | 370/401 |

FOREIGN PATENT DOCUMENTS

| | | |
|---|---|---|
| KR | 20-0432491 | 12/2006 |
| WO | 2005/043286 | 5/2005 |

OTHER PUBLICATIONS

IEEE, "Draft Amendment to Standard for Information Technology—Telecommunications and Information Exchange Between Systems—LAN/MAN Specific Requirements—Part 11: Wireless Medium Access Control (MAC) and Physical Layer (PHY) Specifications," IEEE P802.11v/D0.05, Sep. 2006, XP-040430036.

The State Intellectual Property Office of the People's Republic of China Application Serial No. 200880023613.X, Certificate dated Oct. 23, 2013, 30 pages.

European Patent Office Application U.S. Appl. No. 08778611.7, Office Action dated Jun. 6, 2014, 5 pages.

Oracle, "Oracle Application Server Wireless Developers Guide 10g Release 2", Aug. 2005, 8 pages.

* cited by examiner

WIRELESS NETWORK MANAGEMENT PROCEDURE, STATION SUPPORTING THE PROCEDURE, AND FRAME FORMAT FOR THE PROCEDURE

CROSS-REFERENCE TO RELATED APPLICATIONS

This application is the National Stage filing under 35 U.S.C §371 of International Application No. PCT/KR2008/003948, filed on Jul. 4, 2008, which claims the benefit of earlier filing date and right of priority to Korean Application Nos. 10-2007-0068295, filed on Jul. 6, 2007, and 10-2007-0068296, filed on Jul. 6, 2007.

TECHNICAL FIELD

The present invention relates to a wireless local access network (WLAN), and more particularly, to a WLAN management procedure, a station supporting the procedure, and a frame format for the procedure.

BACKGROUND ART

With the development in information communication technology, a variety of wireless communication technology has been developed. A WLAN permits wireless access to Internet in specific service areas such as home or companies or air planes by the use of portable terminals such as a personal digital assistant (PDA), a laptop computer, and a portable multimedia player (PMP) on the basis of the radio frequency technology.

These days, thanks to the increased availability of WLANs, portable terminal users such as laptop computer users are able to perform their tasks with increased mobility. For example, a user can take his laptop computer from his desk into a conference room to attend a meeting and still have access to his local network to retrieve data and have access to the Internet via one or more modems or gateways present on the local network without being tethered by a wired connection. Similarly, business travelers commonly use their portable terminals to gain access to their email accounts, to check if there is any unread email, and to read and send email.

In the initial WLAN technology, a data rate of 1 to 2 Mbps was supported by the use of frequency hopping, spread spectrum, and infrared communication using a frequency of 2.4 GHz in accordance with the IEEE 802.11. In recent years, with the development of the wireless communication technology, 54 Mbps in maximum can be supported by applying the orthogonal frequency division multiplex (OFDM) technology, etc. to the WLAN. In addition, the IEEE 802.11 has developed or is developing wireless communication technology for improvement in the quality of service (QoS), compatibility of an access point (AP) protocol, security enhancement, radio measurement or radio resource measurement, wireless access in vehicular environment, fast roaming, mesh network, inter-working with external networks, wireless network management, and the like.

The wireless network management procedure for a WLAN provides protocols relevant to the wireless network management, such as allowing a non-AP station or an access point (AP) to collect a variety of information on the wireless network or diagnosing problems of the wireless network. For example, the wireless network management procedure includes an event reporting procedure, a diagnostic reporting procedure, a presence service procedure, a base service set (BSS) transition management procedure, a flexible broadcast multicast service (FBMS) procedure, a traffic filter service (TFS) procedure, and a sleep mode procedure.

The event reporting procedure serves to diagnose states of a network in real time. The even reporting procedure in a WLAN defines a variety of events such as a transition event, a robust security network association (RSNA) event, a peer-to-peer link event, and a system log event as event request/report elements. Event request/report elements other than the system log event define various types of sub-elements. STAs supporting the event reporting procedure should store the last 5 events for the event report elements supported by the STAs after they are associated with an extended service set (ESS).

In the event reporting procedure, when a received even request frame includes requests for the transition event, the RSNA event, and/or the peer-to-peer link event and each event request includes one or more sub-elements, a requested STA contains available event report elements corresponding to a specified condition in an event report frame. On the other hand, when the specified event request does not include any sub-element, the requested STA contains all the available event report elements in the event report frame. When the available event report elements do not fit into one MAC management protocol data unit (MMPDU), the requested STA transmits remaining event report elements using additional event report frames until transmitting all the event report elements.

DISCLOSURE OF INVENTION

Technical Problem

In the event reporting procedure, the requested STA transmits to the requesting STA an event report frame including available event report elements satisfying the conditions specified in the event request elements of the received event request frame or all the available event report elements. However, in the event reporting procedure, since all the available event report elements satisfying the conditions or stored are included in the event report frame, unnecessarily many event report elements (including previous events in addition to the latest events interesting the requesting STA) can be included in the event report frame, regardless of the intention of the requesting STA. In some cases, two or more event report frames may be transmitted to report the events for one event request. Accordingly, in the event reporting procedure, the burden of the WLAN system including the requesting STA and the requested STA is made to increase and unnecessary traffic is caused, thereby deteriorating the utilization efficiency of the wireless channels.

Therefore, a technical goal of the invention is to provide a wireless network management procedure that can reduce the burden of the WLAN system including a requesting STA and a requested STA and enhance the utilization efficiency of wireless channel to enable efficient wireless network management.

Another technical goal of the invention is to provide a station for supporting a wireless network management procedure that can reduce the burden of the WLAN system including a requesting STA and a requested STA and enhance the utilization efficiency of wireless channel to enable efficient wireless network management.

Another technical goal of the invention is to provide a frame format for a wireless network management procedure that can reduce the burden of the WLAN system including a requesting STA and a requested STA and enhance the utilization efficiency of wireless channel to enable efficient wireless network management.

On the other hand, the event request frame includes an event request field for specifying a condition of an event report. However, in the known event reporting procedure, it is prescribed that the requesting STA may not contain the event request field in the event request elements, and that the requested STA having received the event request elements not including the event request field shall include all the available event report elements of the requested event type in the event report frame. However, the transmission of all the available event report elements causes an overload of the system and also causes unnecessary overhead.

Therefore, another technical goal of the invention is to provide a wireless network management procedure that can prevent the overload of a wireless communication system and prevent unnecessary overhead.

TECHNICAL SOLUTION

According to an aspect of the invention, there is provided a wireless network management procedure, the procedure comprising: transmitting a event request frame including one or more event request elements each of which comprises an event type field for specifying the event type of an event request and an event response limit field for specifying the number of requested event report elements; and receiving, in response to the event request frame, an event response frame including event report elements for the event type specified in the event type field as many as the number specified in the event response limit field.

According to another aspect of the invention, there is provided a wireless network management procedure, the procedure comprising: receiving a event request frame including one or more event request elements each of which comprises an event type field for specifying the event type of an event request and an event response limit field for specifying the number of requested event report elements; and transmitting, in response to the event request frame, an event response frame including event report elements for the event type specified in the event type field as many as the number specified in the event response limit field.

According to another aspect of the invention, there is provided a format for an event request frame which is used for wireless network management, the event request frame comprising: a category field which is set to a value indicating a wireless network management category; an action field which is set to a value indicating event request action; a dialog token field which is set to a nonzero value chosen by a station sending the event request frame to identify the request/report transaction; and an event request elements field for specifying a request to a station receiving the event request frame to perform the specified actions, wherein the event request elements field contains one or more event request elements, and wherein each of the event request elements comprises an event type field for specifying the type of event request, an event response limit field for specifying the number of requested event report elements included in an event response frame which is generated in response to the event request frame, and an event request field for containing the event request corresponding to the event type specified in the event type field.

According to still another aspect of the invention, there is provided a station for supporting event service in a wireless network, the station comprising: a processor configured to generate and process frames; and a transceiver operably connected to the processor and configured to transmit and receive the frames for the processor, wherein the transceiver is configured to receive a event request frame including zero or more event request elements each of which comprises an event type field for specifying the event type of an event request and an event response limit field for specifying the number of requested event report elements and forward the received event request frame to the processor; and wherein the processor is configured to generate, in response to the event request frame, an event response frame including event report elements for the event type specified in the event type field as many as the number specified in the event response limit field and forward the event response frame to the transceiver, and wherein the transceiver is configured to transmit the event response frame.

According to still another aspect of the invention, there is provided a station for supporting event service in a wireless network, the station comprising: a processor configured to generate and process frames; and a transceiver operably connected to the processor and configured to transmit and receive the frames for the processor, wherein the processor is configured to generate a event request frame including zero or more event request elements each of which comprises an event type field for specifying the event type of an event request and an event response limit field for specifying the number of requested event report elements and for the generated event request frame to the transceiver, wherein the transceiver is configured to transmit the event request frame and receive, in response to the event request frame, an event response frame including event report elements for the event type specified in the event type field as many as the number specified in the event response limit field and forward the received event response frame to the processor, and wherein the processor is configured to parse the event response frame.

ADVANTAGEOUS EFFECTS

According to the above-mentioned configuration of the invention, the requesting STA specifies the type of requested event of each event request element and the number of event report elements and transmits the event request frame. The requested STA having received the event request frame transmits to the requesting STA the event report elements as many as the number of event report elements specified for the specified event request type. Accordingly, in the configuration, since the requesting STA can limit the number of event report elements as needed, it is possible to reduce the burden of the WLAN system including the requesting STA and the requested STA and to enhance the utilization efficiency of wireless channels, thereby efficiently managing the wireless network.

According to another configuration of the invention, by transmitting the latest event when the event request field is not included in the event request elements, it is possible to prevent the overload of the wireless communication system and to prevent the unnecessary overhead.

BEST MODE FOR CARRYING OUT THE INVENTION

Hereinafter, a wireless network management procedure, a station supporting the procedure, and a frame format for the procedure according to exemplary embodiments of the invention will be described in detail with reference to the accompanying drawings. In the following embodiments, a wireless LAN (WLAN) system is described as a wireless communication system, but this is only exemplary. Accordingly, the embodiments to be described below can be applied to wireless communication systems other than the WLAN system, as long as they can be permitted in nature. In this case, terms or words specific to the WLAN system used in the embodiments can be properly modified into terms or words customarily used in the corresponding wireless communication system.

Figure 1:
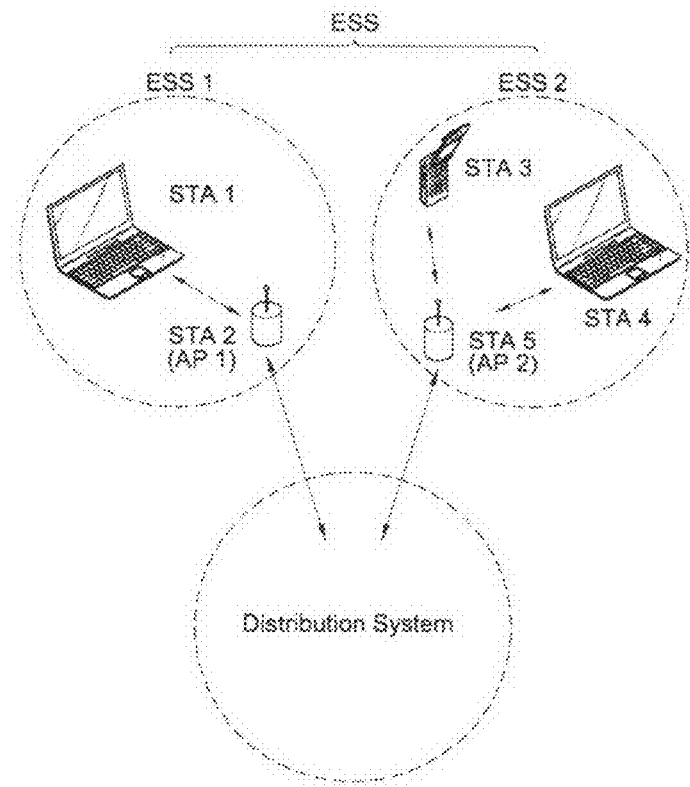
FIG. 1 is a block diagram illustrating a configuration of an infrastructure basic service set as an example of a wireless LAN system.
Figure 2:
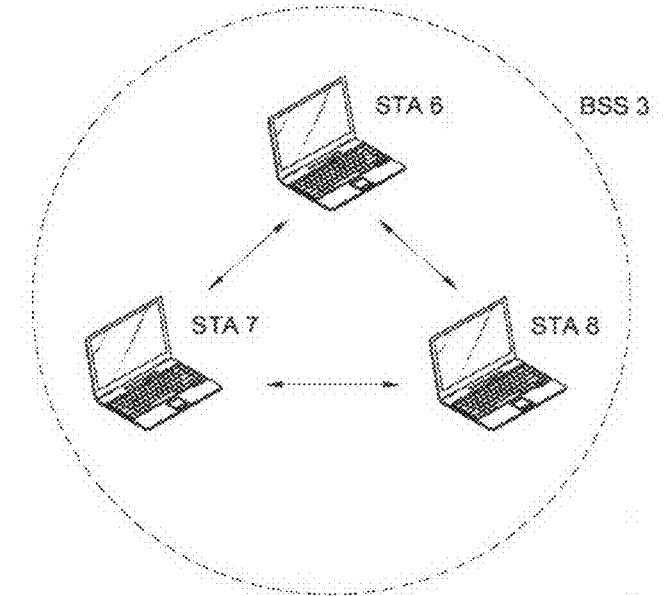
FIG. 2 is a block diagram illustrating a configuration of an independent basic service set as an example of a wireless LAN system.

FIGS. 1 and 2 schematically show configurations of examples of a WLAN system to which the embodiments of the invention can be applied.

As shown in FIGS. 1 and 2, a WLAN system includes one or more basic service sets (BSS). The BSS is a set of stations (STAs) which can be successfully synchronized and communicate with each other, but is not a concept indicating a specific area. The BSS can be classified into an infrastructure BSS and an independent BSS (IBSS). The former is shown in FIG. 1 and the latter is shown in FIG. 2. The infrastructure BSSs BSS1 and BSS2 include one or more Non-AP STAs STA1, STA2, STA3, and STA4, an access point (AP) which is a STA providing a distribution service, and a distribution system (DS) connecting plural APs AP1 and AP2. On the contrary, the IBSS does not include an AP and all the STAs are mobile stations STA6, STA7, and STA8. In the IBSS, an access to the DS is not permitted, thereby constituting a self-contained network.

A STA is a functional unit including a medium access control (MAC) interface and a physical layer interface for a wireless medium in accordance with the IEEE 802.11 standard and includes both APs and non-AP stations in a wide meaning. A station for wireless communication includes a processor and a transceiver and further includes a user interface and a display unit. The processor is a functional unit designed to generate a frame to be transmitted through a wireless network or to process a frame received through the wireless network and serves to perform a variety of functions of controlling the station. The transceiver is operably connected to the processor and is a unit designed to transmit and receive frames through a wireless network.

A portable terminal operated by a user is a non-AP STA (STA1, STA3, STA4, STAG STA7, and STA8). Simply, a STA may mean a non-AP STA. The non-AP STA may be called a wireless transmitting/receiving unit (WTRU), a user equipment (UE), a mobile station (MS), a portable terminal, or a mobile subscriber unit.

The AP (AP1 and AP2) is a functional entity providing connection to the DS through a wireless medium for the associated stations. A communication between the non-AP STAs in the infrastructure BSS including an AP is made through the AP in principle, but the non-AP STAs may communicate directly with each other when a direct link is set up therebetween. The AP may be called a convergence controller, a base station (BS), a node-B, a base transceiver system (BTS), or a site controller, in addition to the tile of an access point.

Plural infrastructure BSSs can be connected to each other through the DS. The plural BSSs connected through the DS are called an extended service set (ESS). The STAs in the ESS can communicate with each other and the non-AP STAs can move from one BSS to another BSS while communicating without any interception.

The DS is a mechanism for allowing an AP to communicate with another AP. Accordingly, the AP can transmit a frame for the STAs associated with the BSS managed by the AP, forward a frame when a STA moves to another BSS, or forward a frame to an external network such as a wired network. The DS may not be a network necessarily, and is not limited in type as long as it can provide a predetermined distribution service defined in the IEEE 802.11 standard. For example, the DS may be a wireless network such as a mesh network or a physical structure for connecting the APs to each other.

Figure 3:
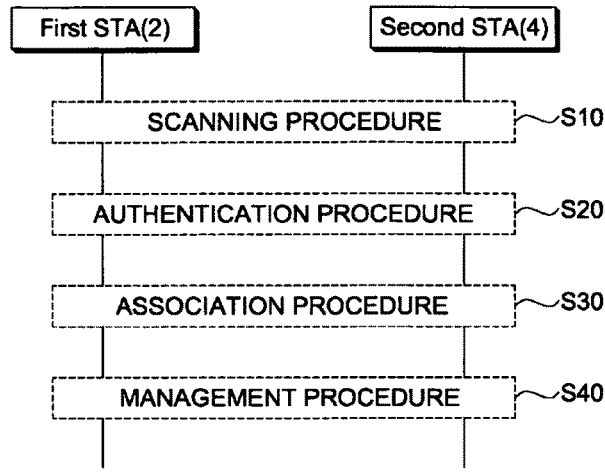
FIG. 3 is a flowchart illustrating a wireless network management procedure in a wireless communication system according to an embodiment of the invention.

FIG. 3 is a flowchart illustrating a management procedure of a wireless network in a wireless LAN system shown in FIG. 1 or 2 or in a wireless communication system including the wireless LAN system or equivalent thereto according to an embodiment of the invention. The flowchart of operations between the first STA 2 and the second STA 4 shown in FIG. 3 can show a procedure performed between a non-AP STA and an AP constituting an infrastructure BSS, but it is obvious to those skilled in the art that the embodiment is not limited to the procedure. For example, the embodiment can be equally or similarly applied to operations between non-AP STAs in an IBSS, operations between mesh points (MP) in a mesh network system, or operation between terminals of different wireless communication systems or between a terminal and a base station, as long as it can be applied thereto in nature.

Referring to FIG. 3, a radio measurement procedure in a wireless communication system according to the embodiment of the invention further includes as preliminary procedures a scanning procedure (S10), an authentication procedure (S20), and/or an association procedure (S30) and further includes a management procedure (S40) which is performed after the preliminary procedures S10 to S30. According to the embodiment of the invention, some procedures of the preliminary procedures may not be essential but arbitrary.

Referring to FIG. 3, the scanning procedure S10 is first performed between the first STA 2 and the second STA 4. The scanning procedure S10 is a procedure for allowing the first STA 2 to search for a candidate station to be associated in the association procedure S30, for example, a procedure for allowing a non-AP STA to search for an AP in the infrastructure BSS. However, the scanning procedure in a wider meaning may include a procedure for allowing a non-AP STA to search for a neighboring non-AP STA in the IBSS or a procedure for allowing an MP to search for its neighboring MP in a mesh network.

The scanning procedure can be classified into two types. One is a passive scanning method using a beacon frame transmitted from APs including the second STA 4. In this method, the first STA 2 to access a wireless LAN can search for an accessible BSS by receiving a beacon frame periodically transmitted from the second STA 4 which is an AP managing the corresponding BSS. The passive scanning method can be applied when the second STA 4 is an AP transmitting a beacon frame.

The other is an active scanning method. In this method, the first STA 2 to access a wireless LAN system, for example, an AP, first transmits a probe request frame. The second STA 4 having received the probe request frame transmits a probe response frame including a service set ID (SSID) of the BSS managed by the AP and information on capabilities supported by the AP. Accordingly, the first STA 2 can know existence of a candidate AP and a variety of information on the candidate AP from the received probe response frame.

Referring to FIG. 3, the authentication procedure S20 is performed between the first STA 2 and the second STA 4. The authentication procedure S20 is a procedure for negotiating an authentication process and an encoding method between entities participating in a wireless communication. For example, the first STA 2 can perform the authentication procedure S20 to be associated of one or more APs, which had searched for in the scanning procedure S10. In the WLAN, since an open system authentication method is used in most cases, the second STA 4 as an AP performs the authentication process without any condition in response to the authentication request from the first STA 2. Reinforced authentication methods include EAP-TLS (Extensible Authentication Protocol-Transport Layer Security), EAP-TTLS (Extensible Authentication Protocol-Tunneled Transport Layer Security), EAP-FAST (Extensible Authentication Protocol-Flexible Authentication via Secure Tunneling), and PEAP (Protected Extensible Authentication Protocol) based on the IEEE 802.1x standard.

When the authentication process is successfully completed in the authentication procedure S20, the first STA 2 performs the association procedure S30. The association procedure S30 may be an arbitrary procedure which is performed when the first STA 2 is a non-AP STA and the second STA 4 is an AP. The association procedure S30 is to set up an identifiable link, that is, a wireless link, between the first STA 2 and the second STA 4. In the association procedure S30, the first STA 2 transmits an association request frame to the second STA 4 having successfully completed the authentication procedure S20 and the second STA 4 transmits to the first STA 2 an association response frame having a state value of "successful" in response to the association request frame. The association response frame includes an identifier for identifying the association with the first STA 2, for example, an association ID (AID).

When the association procedure S30 has been successfully completed but the connection state between the first STA 2 and the second STA 4 may be deteriorated due to a variable channel condition, the first STA 2 can perform the association procedure with another accessible AP again, which is called a re-association procedure. The re-association procedure is very similar to the above-mentioned association procedure S30. More specifically, in the re-association procedure, the first STA 2 transmits a re-association request frame to a different AP (an AP having successfully completed the authentication procedure S20 among the candidate APs searched for in the scanning procedure S10) other than the AP currently associated therewith, and the different AP transmits a re-association response frame to the first STA 2. However, the re-association request frame further includes information on the AP previously associated therewith and the re-associated AP can transmit data buffered in the second STA 4, which is an existing AP, using the information.

Referring to FIG. 3, the management procedure (S40) is performed between the first STA 2 and the second STA 4 having completed the authentication procedure S20 and/or the association procedure S30 in addition thereto. Although it has been shown in FIG. 3 that the management procedure is performed between the first STA 2 and the second STA 4 having completed the association procedure S30 in the infrastructure BSS, the radio measurement procedure S40 described later according to an embodiment of the invention is not limited to the figure.

Figure 4:
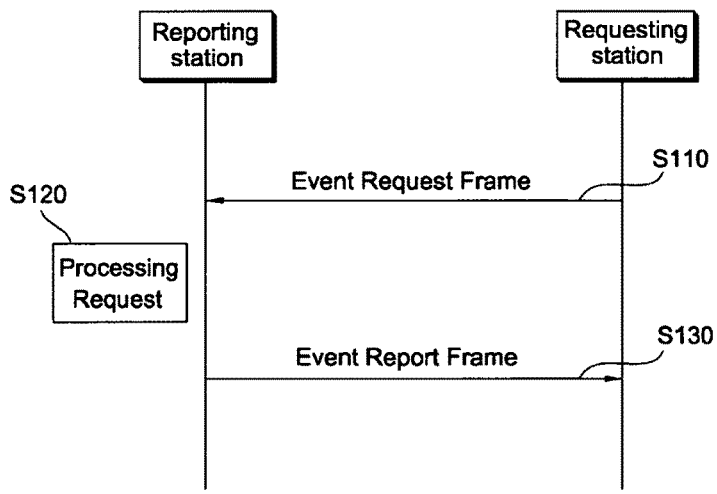
FIG. 4 is a flowchart illustrating a wireless network management procedure according to a first embodiment of the invention.

FIG. 4 is a flow diagram illustrating a wireless network management procedure according to a first embodiment of the invention.

Referring to FIG. 4, a station transmitting an event request frame is called a re-questing STA and a station transmitting an event report frame is called a reporting STA or a requested STA. In this embodiment, the requesting STA is an access point (AP) and the reporting STA is a non-AP STA. Alternatively, in the wireless network management procedure in the IBSS, the requesting STA and the reporting STA may both be a non-AP STA.

Referring to FIG. 4, the requesting STA transmits an event request frame to the reporting STA (S110). The event request frame can include one or more event request elements. The event request frame can further include a field for specifying an event type (for example, event type field) and a field for specifying the number of requested report elements (for example, a count field or an event response limit field).

The event type can include, for example, a transition event, an RSNA event, a peer-to-peer link event, and a system log event. A variety of sub-elements can be defined in each event type. The count field or the event response limit field of the event request frame represents the number of event report elements to be included in the event response frame or the number of sub-elements included in the corresponding event report element. The format of the event request frame will be described in detail later.

The requested STA or the reporting STA processes the received event request frame (S120). The reporting STA can store information on the latest 5 events every event type after accessing the AP in the ESS. In general, the reporting STA confirms the event types included in the event request frame or the sub-elements of each event type and contains relevant event info, illation in the event report frame. In this case, the reporting STA shall only include event report elements for the requested event types as many as the event response limit field or the count field. When no event information is stored for the event type specified in the event request frame, that is, when there is no available event report, the reporting STA generates an event report frame not including any event report element.

The reporting STA transmits the generated event report frame to the requesting STA in response to the event request frame (S130). The event report frame can include the same number of event report elements as specified in the event response limit field or the count filed for the requested event type. If the event report elements do not fit into a single MMPDU, the reporting STA shall send the remaining elements in additional event report frames until all the event report elements have been returned to the requesting STA.

In this embodiment, the event report frame includes a count field indicating the number of events. The event report frame includes a variety of event information by the event type. The details of the event report frame are described later.

Figure 5:
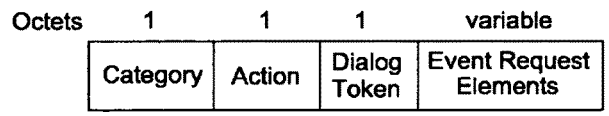
FIG. 5 is a diagram illustrating a format of an even request frame according to an embodiment of the invention.

FIG. 5 is a diagram illustrating a format of the event request frame according to an embodiment of the invention. The event request frame is used to allow a station (requesting STA) to request another station (requested STA or reporting STA) for one or more event information on one or more event report elements, similarly to step S110 of FIG. 4.

Referring to FIG. 5, the event request frame includes a category field, an action field, a dialog token field, and one or more event request element fields.

The category field is set to a value indicating that the corresponding frame belongs to a wireless network management category and for example, has a size of 1 octet. The action field is set to a value indicating that the frame is an event request frame, and for example, has a size of 1 octet. The dialog token field is used to identify the exchange of frame between stations, and is set to a value selected by the station (that is, the requesting STA) transmitting the event request frame so as to identify the exchange of the event request frame and the event report frame. The dialog token field has, for example, a size of 1 octet.

The event request element field is a field including one or more event request elements and the size thereof is variable. The size and number of event request element fields included in the event request frame can be limited by the set size of a MAC management protocol data unit (MMPDU).

Figure 6:
FIG. 6 is a diagram illustrating a format of an event request element included in an even request element field shown in FIG. 5.

FIG. 6 is a diagram illustrating a format of an event request element included in the event request element field shown in FIG. 5.

Referring to FIG. 6 the event request element includes an element ID field, a length field, an event token field, an event type field, an event count field, and an event request field. The event request element may further include an event count field.

The element ID field is set to a value indicating that the information element is an event request element. The length field is set to various values depending on the length of the event request field. The event token field is set to a specific value for identifying the event request element and an event report element corresponding thereto. The event type field indicates an event type to be requested using the event request element. Table 1 shows examples of the event type.

TABLE 1

| Name | Event Type |
|---|---|
| Transition Event Request | 0 |
| RSNA Event Request | 1 |
| Peer-to-Peer Link Event Request | 2 |
| System Log (Syslog) Request | 3 |
| Reserved | 4-255 |

The event count field is set to a value indicating the number of requested events, that is, the number of event report elements for which the requesting STA requests the reporting STA or the requested STA for the event type specified in the event type field. Accordingly, the reporting STA having received the event request frame including the event request elements can transmit the event report frame including the event report elements as many as the latest events corresponding to the event type specified in the event type field being specified in the event count field. Here, the title of the event count field is exemplary and may be called, for example, an event response limit field.

It is illustrated in FIG. 6 that the size of the event count field is 1 octet and is located subsequent to the event type field. However, it is only an example and the position or size of the event count field can be modified variously.

In this embodiment, the requesting STA can specify the number of event report elements to be received for the corresponding event type, when transmitting the event request frame. Unlike the existing procedure of transmitting all the event information corresponding to the event type when the event request field is not included in the event request element, the reporting STA transmits to the requesting STA the event report elements as many as the value specified in the event count field or the event response limit field. Accordingly, according to this embodiment, it is possible to reduce the burden on the WLAN system including the requesting STA and the requested STA and to improve the utilization efficiency of wireless channels, thereby efficiently managing the wireless network.

Referring to FIG. 6 the event request element includes an event request field corresponding to the event type. The event request field of the event request element includes a transition event request, an RSNA event request, a peer-to-peer link event request, and a system log (Syslog) request. Each event request includes plural sub-elements. However, the system log event is used to provide the requesting STA with human-readable vendor specific information on the reporting STA and may not include any particular sub-element.

Figure 7:
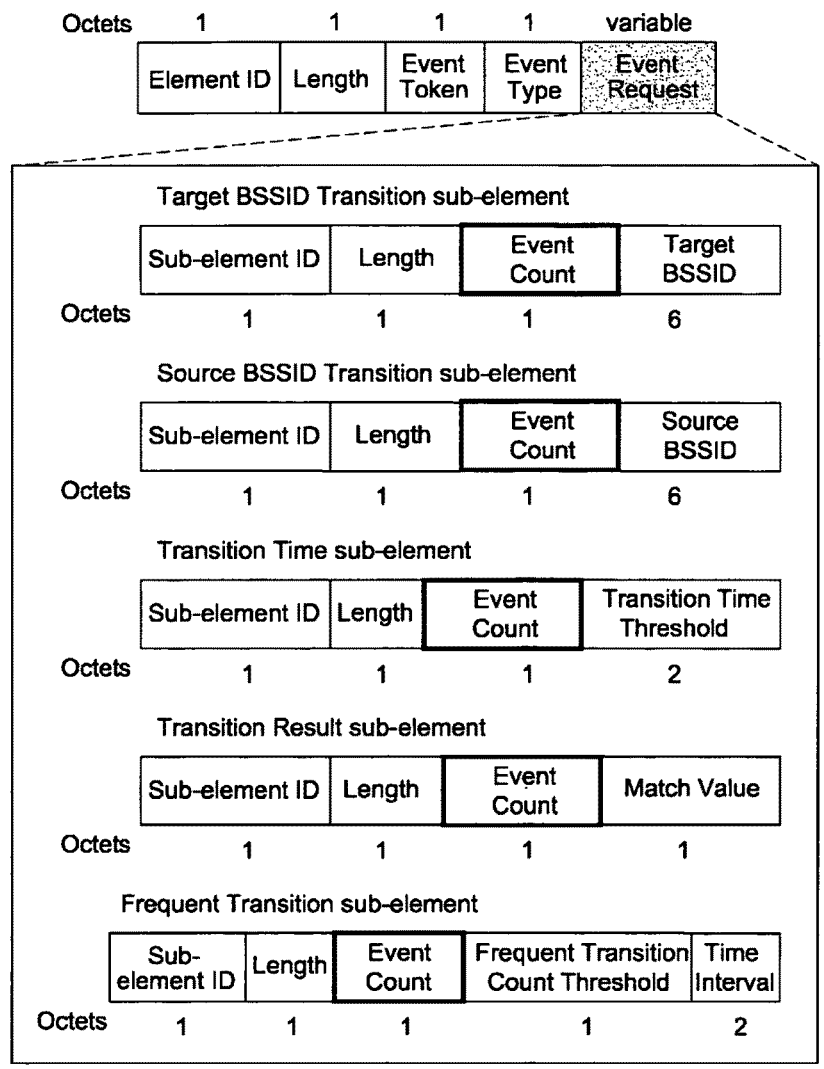
FIG. 7 is a diagram illustrating formats of transition event request elements as an example of a sub-element included in the even request field shown in FIG. 6.

FIG. 7 shows sub-elements of the transition event request element as examples of the sub-elements included in the event request field shown in FIG. 6 according to the embodiment. The transition event request element is used to request for event information for changing the BSS in one ESS.

TABLE 2

| Transition Event Request Sub-element | Sub-element ID |
|---|---|
| Target BSSID Transition | 0 |
| Source BSSID Transition | 1 |
| Transition Time | 2 |
| Transition Result | 3 |
| Frequent Transition | 4 |
| Reserved | 5-255 |

Table 2 shows sub-elements of the transition event request and examples of sub-element IDs thereof. Referring to Table 2, the sub-elements of the event request field can include a target BSSID transition sub-element, a source BSSID transition sub-element, a transition time sub-element, a transition result sub-element, and a frequent transition sub-element.

The target BSSID transition sub-element is used to request for a transition event report when the target BSSID is equal to the target BSSID included in the sub-element. The target BSSID transition sub-element includes a sub-element ID field, a length field, a transition count field or an event count field, and a target BSSID field.

The source BSSID transition sub-element is used to request for a transition event report when the source BSSID is equal to the source BSSID included in the sub-element. The source BSSID transition sub-element includes a sub-element ID field, a length field, a transition count field or an event count field, and a source BSSID field.

The transition time sub-element is used to request for a transition event report when the transition time is equal to the transition time threshold included in the sub-element. The transition time sub-element includes a sub-element ID field, a length field, a transition count field or an event count field, and a transition time threshold field.

The transition result sub-element is used to request for a transition event report when the transition result is equal to the transition result defined in the sub-element. The transition result sub-element includes a sub-element ID field, a length field, a transition count field or an event count field, and a match value field.

The frequent transition sub-element is used to request for a transition event report when the total number of transitions during a time interval defined in the sub-element reaches a frequent transition count threshold included in the sub-element. The frequent transition sub-element includes a sub-element ID field, a length field, a transition count field or an event count field, a frequent transition count threshold field, and a time interval field.

In this embodiment, the transition count field or the event count field included in the sub-elements indicate the number of transition event report elements by the sub-elements included in the transition event report. That is, the requesting STA can specify the number of event report elements by the sub-elements of the transition event and request for the events. The reporting STA confirms the transition count field or the event count field included in each sub-element and transmits the event report frame including the transition event report elements as many as specified in the transition count field. The position and size of the transition count field are only an example. The transition count field may be located at any position of the sub-element and the size of the transition count field can be changed variously.

Figure 8:
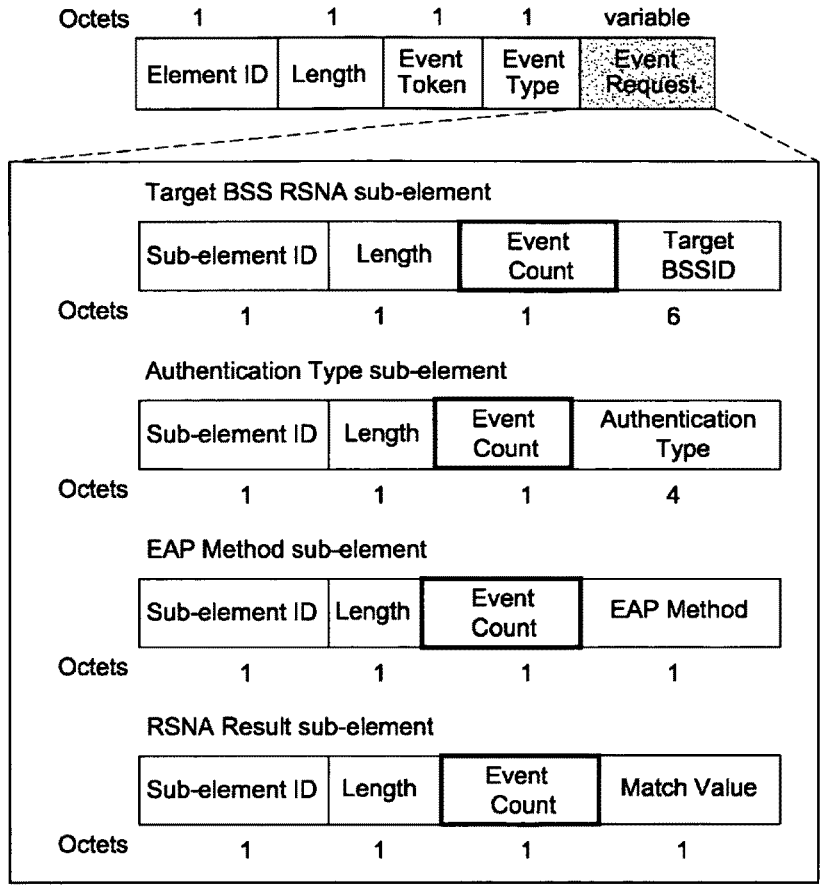
FIG. 8 is a diagram illustrating a format of an RSNA event request as another example of the sub-element included in the event request field shown in FIG. 6.

FIG. 8 is a diagram illustrating a format of an RSNA event request as an example of the sub-element included in the event request field shown in FIG. 6 according to the embodiment. The RSNA event request is used to provide authentication event information of the reporting STA.

TABLE 3

| RSNA Event Request Sub-element | Sub-element ID |
|---|---|
| Target BSS RSNA | 0 |
| Authentication Type | 1 |
| EAP Method | 2 |
| RSNA Result | 3 |
| Reserved | 4-255 |

Table 3 shows examples of an RSNA event request sub-elements and the sub-element ID. Referring to Table 3, the sub-elements of the RSNA event request can include a target BSS RSNA sub-element, an authentication type sub-element, an extensible authentication protocol (EAP) method sub-element, and an RSNA result sub-element.

The target BSS RSNA sub-element is used to request for an RSNA event report when the target BSSID is equal to the target BSSID included in the sub-element. The target BSS RSNA sub-element includes a sub-element ID field, a length field, an event count field, and a target BSSID field.

The authentication type sub-element is used to request for an RSNA event report when the authentication type is equal to the authentication type included in the sub-element. The authentication type sub-element includes a sub-element ID field, a length field, an event count field, and an authentication type field.

The EAP method sub-element is used to request for an RSNA event report when the EAP method is equal to the event method included in the sub-element. The EAP method sub-element includes a sub-element ID field, a length field, an event count field, and an EAP method field.

The RSNA result sub-element is used to request for an RSNA event report when the RSNA result is equal to the result defined in the sub-element. The RSNA result sub-element includes a sub-element ID field, a length field, an event count field, and a match value field.

In this embodiment, the event count field included in the sub-elements indicates the number of RSNA event report elements by the sub-elements included in the RSNA event report. That is, the requesting STA can specify the number of event report elements by the sub-elements of the RSNA event and request for the events. The reporting STA confirms the transition count field or the event count field included in each sub-element and transmits the event report frame including the transition event report elements as many as specified in the transition count field. The position and size of the transition count field are only an example. The transition count field may be located at any position of the sub-element and the size of the transition count field can be changed variously.

Figure 9:
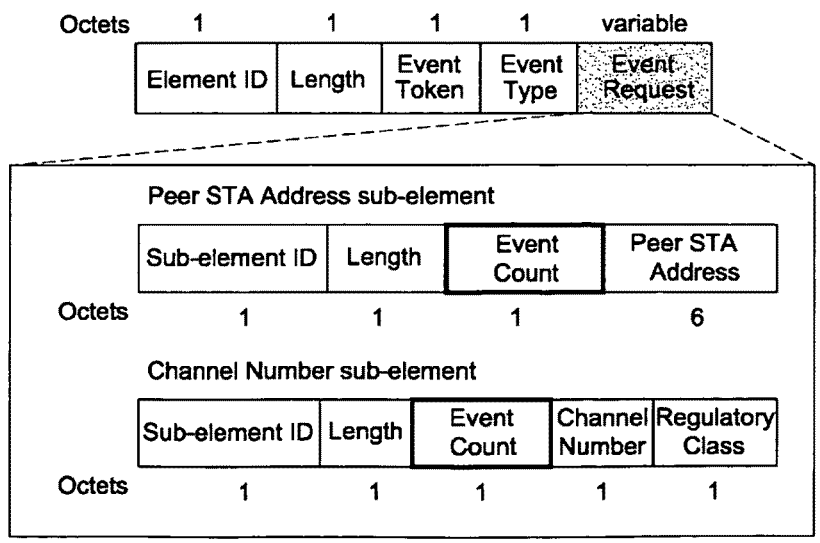
FIG. 9 is a diagram illustrating a format of a peer-to-peer link event request as another example of the sub-element included in the event request field shown in FIG. 6.

FIG. 9 is a diagram illustrating a format of a peer-to-peer link event request sub-element as an example of the sub-element included in the event request field shown in FIG. 6 according to the embodiment. The peer-to-peer link event request is used to provide a peer-to-peer connectivity event of the reporting STA.

TABLE 4

| Peer-to-Peer Link Event Request Sub-element | Sub-element ID |
|---|---|
| Peer STA Address | 0 |
| Channel Number | 1 |
| Reserved | 2-255 |

Table 4 shows examples of sub-elements of the peer-to-peer event request and IDs of the sub-elements. Referring to Table 4, the sub-elements of the peer-to-peer link event request include a peer STA address sub-element and a channel number sub-element.

The peer STA address sub-element is used to request for a peer-to-peer link event report when the peer STA address is equal to the MAC address included in the sub-element. The peer STA address sub-element includes a sub-element ID field, a length field, an event count field, and a peer STA address field.

The channel number sub-element is used to request for a peer-to-peer link event report when the operating channel number is equal to the channel number included in the sub-element. The channel number sub-element includes a sub-element ID field, a length field, an event count field, a channel number field, and a regulatory class field. The regulatory class field designates the frequency band of the peer-to-peer link.

In this embodiment, the event count field included in the sub-elements indicates the number of peer-to-peer link event report elements by the sub-elements included in the peer-to-peer link event report. That is, the requesting STA can specify the number of event report elements by the sub-elements of the peer-to-peer link event and request for the events. The reporting STA confirms the event count field included in each sub-element and transmits the event report frame including the peer-to-peer link event report elements as many as specified in the event count field. The position and size of the transition count field are only an example. The transition count field may be located at any position of the sub-element and the size of the transition count field can be changed variously.

Figure 10:
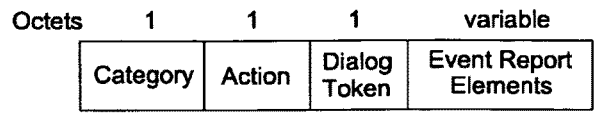
FIG. 10 is a diagram illustrating a format of an even report frame according to an embodiment of the invention.

FIG. 10 is a diagram illustrating a format of an even report frame according to an embodiment of the invention. The event report frame is used to allow the reporting STA or the requested STA to provide the requesting STA with event information on the requested number of event report elements for the requested event type in response to the received event request frame, similarly to step S130 of FIG. 4.

Referring to FIG. 10, the event report frame includes a category field, an action field, a dialog token field, and an event report element field. The category field is set to a value indicating that the frame belongs to a wireless network management category, and for example, has a size of 1 octet. The action field is set to a value indicating that the frame is an event report frame, and for example, has a size of 1 octet. The dialog token field is set to the same value as set in the received event request frame and has, for example, a size of 1 octet.

The event report element field is a field including one or more event request elements and the size thereof is variable. The size of the event report element field and the number of event request elements included therein are limited by the set size of the MMPDU. According to this embodiment, the event report element field includes the event report elements as many as the number of event report elements specified in the event response limit field or the event count field of the received event request frame. If there is no available Event report of the type specified in the Event Request frame, the reporting STA shall send Event Report frame without any Event Report elements. If the Event Report elements do not fit into a single MMPDU, the reporting STA shall send the remaining elements in additional Event report frames until all Event report elements have been returned to the requesting STA.

Figure 11:
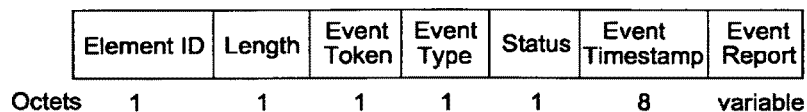
FIG. 11 is a diagram illustrating a format of an even report element included in an event report element field shown in FIG. 10

FIG. 11 is a diagram illustrating a format of an event report element included in the event report element field shown in FIG. 10. Referring to FIG. 11, the event report element includes an element ID field, a length field, an event token field, an event type field, a status field, an event timestamp field, and an event report field. The element ID field is set to an ID value indicating an event report element of various information elements. The length field is set to various values depending on the length of the event report field. The event token field is set to a value indicating an event token corresponding to the event request element of the event request frame. The event type field indicates a type of the event report. Table 5 shows examples of the event report types.

TABLE 5

| Name | Event Type |
| --- | --- |
| Transition Event Report | 0 |
| RSNA Event Report | 1 |
| Peer-to-Peer Link Event Report | 2 |
| System Log (Syslog) Report | 3 |
| Reserved | 4-255 |

The status field indicates the entire response results to the event request/report exchange indicated by the dialog token. The response results to the event request include "successful", "fail", "refused", and "incapable." The "successful" indicates that the reporting STA can response using one or more event response element, the "fail" indicates that the reporting STA cannot process the received event request element within the predetermined time, the "refused" indicates that the reporting STA cannot accept the received event request element, and the "incapable" indicates that the reporting STA does not have the capability of generating the event report of the type specified in the event request frame.

The event timestamp field indicates a timing synchronization function (TSF) timer value of the station of which an event is recorded. The event report field includes an event report corresponding to the event type. The event timestamp field and the event report field are provided when the size of the status field is "0", that is, when the status field is omitted.

The event report includes a transition event report, an RSNA event report, a peer-to-peer link event report, and a system log (Syslog) report.

Figure 12:
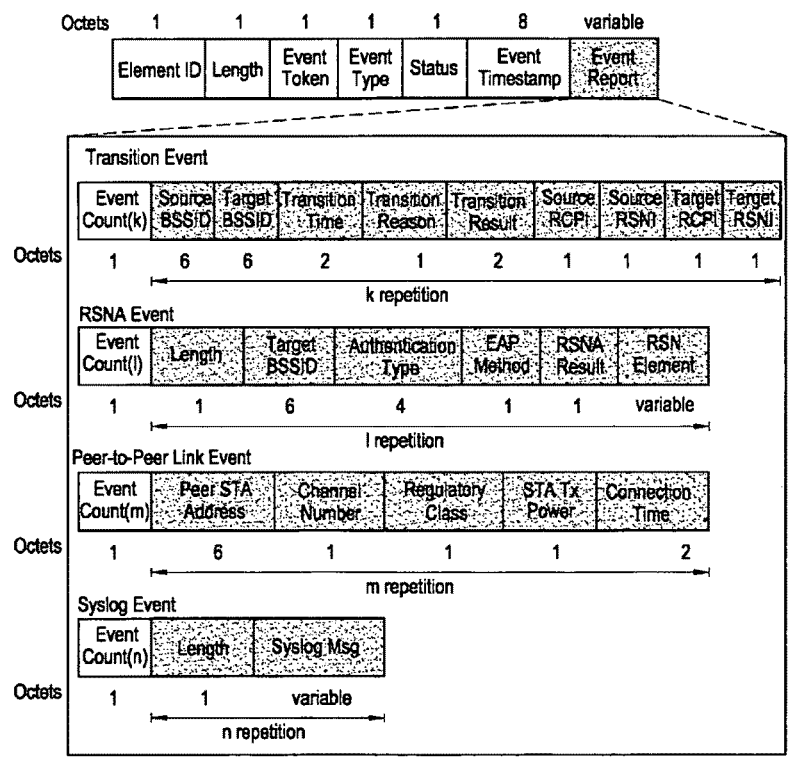
FIG. 12 is a diagram illustrating formats of event report elements included in the event report field shown in FIG. 11.

FIG. 12 is a diagram illustrating formats of event report elements included in the event report field shown in FIG. 11. The respective event report elements shown in FIG. 12 include an event count field. The event count field indicates the number of event report elements included in the event report. Accordingly, according to this embodiment, plural event reports can be included for each event report element.

Referring to FIG. 12, the transition event report is used to report event information on the change in BSS in one ESS in response to the transition event request. The transition event report includes an event count field, a source BSSID field, a target BSSID field, a transition time field, a transition reason field, a transition result field, a source RCPI (Received Channel Power Indicator) field, a source RSNI field, a target RCPI field, and a target RSNI field.

The fields subsequent to the event count field can be repeatedly included by the number of event count fields. The repeated fields may be an event entry. For example, the fields from the source BSSID field to the target RSNI field can be treated as an event entry and this event entry can be included repeatedly by the number of count fields k. One event entry can indicate a piece of event information. Alternatively, one event entry may be a response to plural sub-elements included in the event request.

The event count field indicates the number of event entries of the transition event. That is, the event report field includes the event entries as much as the number of event count fields k. From the source BSSID field to the target RSNI field can be repeatedly included by the number of count fields k.

The source BSSID field indicates a BSSID address of a first AP at the time of transition in BBS. The target BSSID field indicates a BSSID of an AP as a transition target. The transition time field indicates a BSS transition time in the unit of millisecond (ms). The transition reason field indicates a reason for the transition. The source RCPI field indicates the channel power of the latest frame received from the source BSSID by the STA. The source RSNI field indicates the noise-to-signal ratio of the latest frame received from the source BSSID. The target RCPI field indicates the channel power of the frame received after accessing the target BSSID again. The target RSNI field indicates the noise-to-signal ratio received after accessing the target BSSID again.

The RSNA event report is used to provide authentication event information of the reporting STA in response to the RSNA event request. The RSNA event report includes an event count field, a length field, a target BSSID field, an authentication type field, an EAP method field, an RSNA result field, and an RSN element field.

The event count field indicates the number of event entries of the RSNA event. That is, the event report field can include the event entries as many as the number of event count fields (l). The fields from the length field to the RSNI element field can be repeatedly included by the number of event count fields (l). The length field indicates the size of the RSN element field having a variable size. The authentication type field indicates the authentication type used for authentication trail. The EAP method field indicates the EAP type assigned by IANA (Internet Assigned Number Authority). The RSNA result field indicates the RSNA extension result. The RSN element field indicates the entire details of the RSN information elements negotiated in the authentication trial.

The peer-to-peer event link report is used to provide a peer-to-peer connectivity event of the reporting STA in response to the peer-to-peer event request. The peer-to-peer event link report includes an event count field, a peer STA address field, a channel number field, a regulatory class field, a STA Tx power field, and a connection time field.

The event count field indicates the number of event entries of the peer-to-peer event. That is, the event report field can include the event entries as many as the number of event count fields (m). The fields from the peer STA address field to the connection time field can be repeatedly included by the number of event count fields (m). The peer STA address field indicates the MAC address of a peer station of a peer-to-peer link. The channel number field indicates the number of operating channels of the peer-to-peer link. The regulatory class field indicates an operating frequency band of the peer-to-peer link. The STA Tx power field indicates the average transmission power of the reporting STA. The connection time field indicates the connection time in the unit of seconds.

The system log report is used to provide human-readable vendor specific information on the reporting STA to the requesting STA in response to the system log request. The system log report includes an event count field, a length field, and a system log message (syslog Msg) field.

The event count field indicates the number of event entries of the system log event. That is, the event report field can include the event entries as many as the number of event count fields (m). The fields from the length field to the system log message field can be repeatedly included by the number of event count fields (m). The length field indicates the size of the system log message field having a variable size. The system log message field indicates a PRI (Primary Rate Interface), a header, and a part of message of the system log message.

Figure 13:
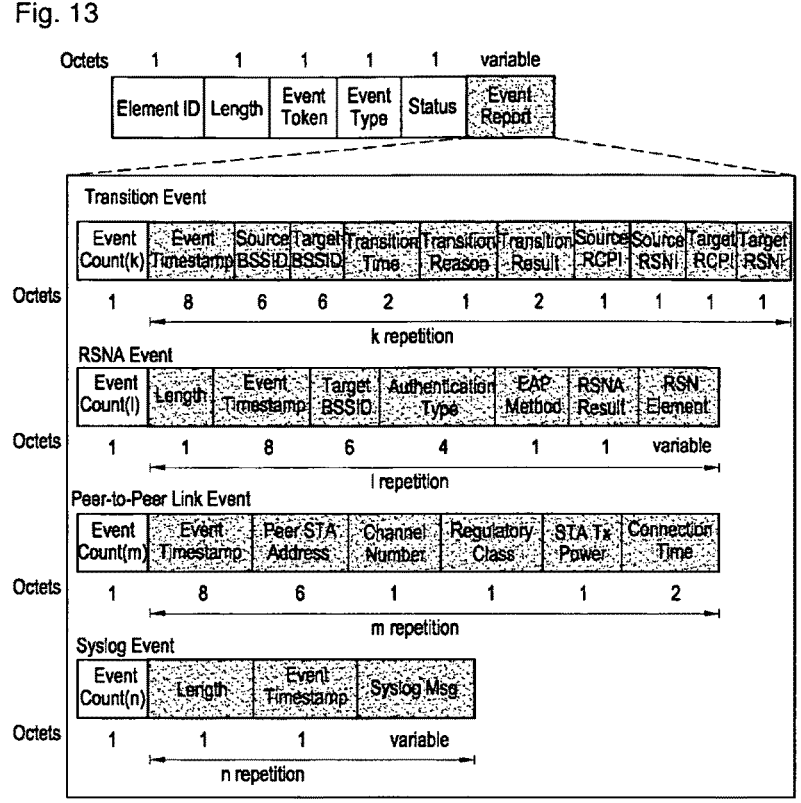
FIG. 13 is a diagram illustrating other formats of the event report elements included in the event report field shown in FIG. 11.

FIG. 13 is a diagram illustrating other formats of the event report elements included in the event report field shown in FIG. 11. However, regarding the event report elements shown in FIG. 13, the event timestamp field included in the event report elements shown in FIG. 11 is included in the event report field for the respective event report elements.

Referring to FIG. 13, since the count field and the timestamp field are included in each event report, plural events can be included in each event report and the time when the event is recorded can be known.

In the transition event report, the fields from the event timestamp field to the target RSNI field can be repeatedly included by the number of event count fields (k). In the RSNA event report, the fields from the length field to the RSN element field including the event timestamp field can be repeatedly included by the number of event count fields (l). In the peer-to-peer link event report, the fields from the event timestamp field to the connection time field can be repeatedly included by the number of event count fields (m). In the system log report, the fields from the length field to the system log message field including the event timestamp field can be repeatedly included by the number of event count fields (n).

When the event timestamp field is not included in the event report field, the whole time of the event report can be notified. However, since the event timestamp field is repeatedly included by the number of event count fields of the respective event reports of the event report field, the time when each event is recorded can be known.

The requesting STA can transmit an event request frame not including the count field. Alternatively, the requesting STA can designate the total number of event requests by containing the event count field in the event request frame, or the re-questing STA can designate the number of event entries to be reported by the sub-elements.

The reporting STA can transmit an event report frame including the latest event entry corresponding to the event request designated by the event request frame. Alternatively, the reporting STA can transmit the event report frame including the event entries by the number of event count fields among the events corresponding to the event request. Alternatively, the reporting STA can transmit the event report frame including the event entries by the number of sub-element count fields among the events corresponding to the event request. Alternatively, the reporting STA can generate and transmit the event report frames including one event entry among the events corresponding to the event request designated by the event request frame by the number of transition count fields or event count fields.

A second embodiment of the invention will be described now. The second embodiment of the invention also relates to a wireless network management procedure, and differences from the first embodiment will be described mainly.

For the purpose of real-time diagnosis of networks in a wireless network system, STAs can exchange an event request frame and an event report frame periodically or as needed. The event request frame and the event report frame include information on transition, information on RSNA, information on peer-to-peer, and information on system log.

Figure 14:
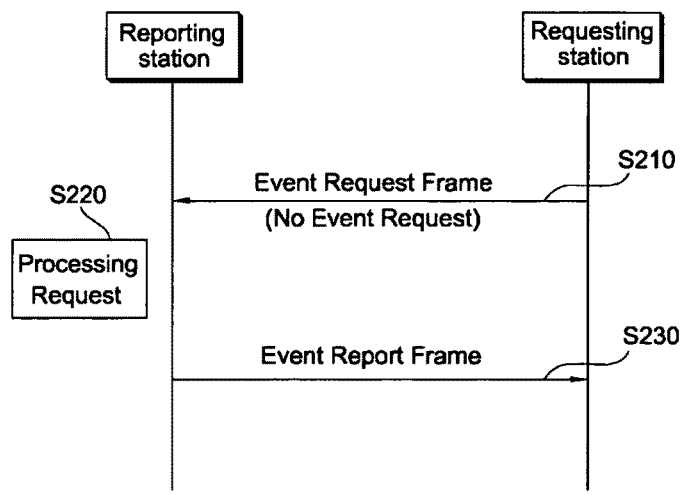
FIG. 14 is a flow diagram illustrating a wireless network management procedure according to an example of a second embodiment of the invention.

FIG. 14 is a flow diagram illustrating a wireless network management procedure according to an example of this embodiment.

Referring to FIG. 14, a requesting STA transmits an event request frame to a requested STA or a reporting STA (S210). At this time, the event request elements of the event request frame does not include any event request field. The reporting STA having received the event request frame processes the received event request frame (S220). At this time, the reporting STA confirms a dialog token field, an event token field, and an event request field included in the received event request frame and determines how to process the event request frame. When the event type of the received event request frame does not include any event request field, the reporting STA contains the latest event information before receiving the event request frame in the event report elements. The reporting STA transmits an event report frame including the latest event report elements to the requesting STA (S230).

According to an example of this embodiment, the reporting STA shall send the latest event report element for the requested event type when the event request field is not present in the event request element. Accordingly, unlike the known procedure of transmitting an event report frame including all the event report elements for the requested event type when the event request field is not present, only the latest event report elements are reported, thereby reducing the unnecessary overhead.

Figure 15:
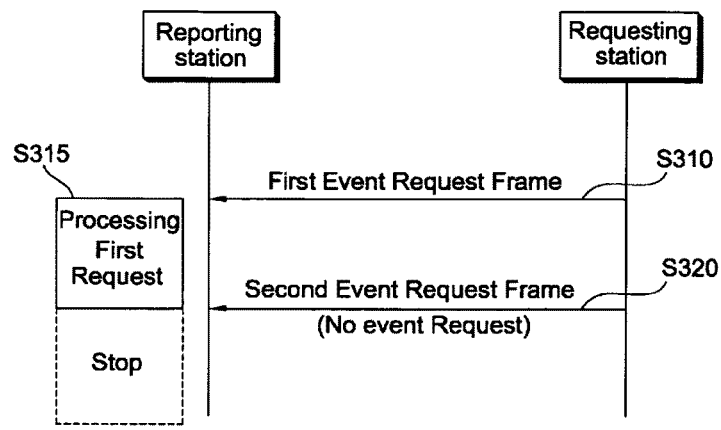
FIG. 15 is a flow diagram illustrating a wireless network management procedure according to another example of the second embodiment of the invention.

FIG. 15 is a flow diagram illustrating a wireless network management procedure according to another example of the second embodiment of the invention. In this example, the reporting STA receives an additional event request frame not including any event request field in the course of processing the previously received event request frame.

Referring to FIG. 15, the requesting STA transmits a first event request frame to the reporting STA (S310). The first event request frame can include one or more event request elements, which specify information on the event report elements which should be included in an event report frame by the reporting STA.

The reporting STA having received the first event request frame starts processing the first event request frame (first process) (S315). The reporting STA generates the event report frame corresponding to the event element requested by the first event request frame from the stored event information. The method of allowing the reporting STA to process the first event request frame is not limited.

The reporting STA receives a second event request frame from the same requesting STA in the course of processing the first event request frame (S220). Here, it is assumed that the second event request frame does not include any event request field. In this example, when the reporting STA receives repeatedly the event request frames not including the event request field from the same requesting STA in the course of processing the previously received event request frame, the reporting STA does not process the second event request frame received later. However, when the dialog token of the first event request frame is equal to the dialog token of the second event request frame, the reporting STA recognizes the second event request frame not including the event request field as a command for stopping the process of the first event request frame and stops the procedure for the first event request frame.

In this example, the reporting STA does not transmit any event report frame in response to the first event request frame and the second event request frame. If a STA receives a subsequent event request frame with no event request field before the event report from a previous request has been completed, the STA shall stop responding to the request.

Although it has been described above that the previous event request is stopped when an event request frame not including an event request field is received from the same request station regardless of the dialog token or the event token included therein, the invention is not limited to the case, but the previous event request may be stopped selectively or partially depending on the dialog token or the event token included in the event request frame. For example, the previous event request may be stopped only when the dialog token of the previous event request is equal to the dialog token of the subsequent event request, or the previous event request may be stopped for the portion where the event token of the previous event request is equal to the event token of the subsequent event request On the other hand, the event request frame can include plural event requests, but the event report frame includes only one event report. Accordingly, plural event report frames are necessary for one event request frame including plural event requests. Particularly, in the conventional procedure where all the event report elements are transmitted when an event request frame not including the event request field is received, the event report frames as many as the number of event report elements should be transmitted, thereby increasing the load.

In the event report frame, plural event entries can be included in the event report field without the size of the MMPDU, and the number of event entries included in the event report field can be designated by the event request frame. Since the example of the event request frame designating the number of event entries has been described with reference to FIGS. 5 and 6 detailed description thereof is omitted.

Figure 16:
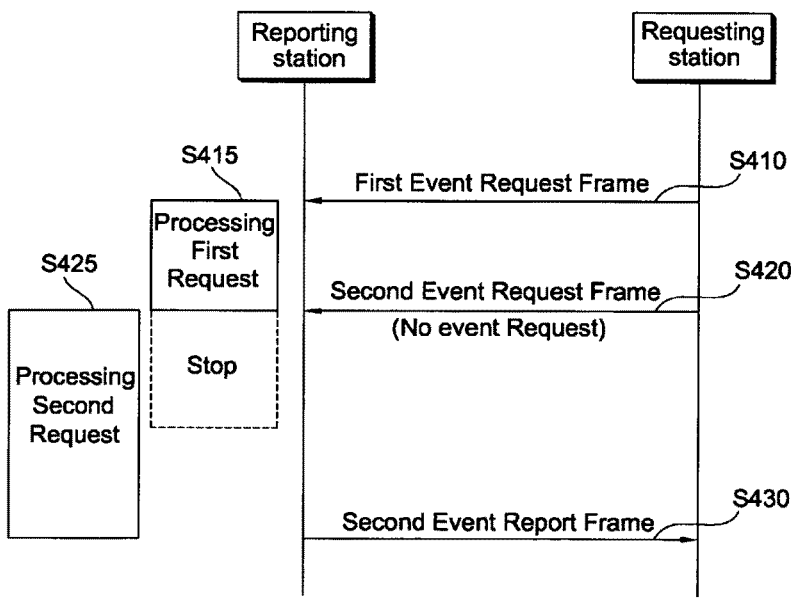
FIG. 16 is a flow diagram illustrating a wireless network management procedure according to still another example of the second embodiment of the invention.

FIG. 16 is a flow diagram illustrating a wireless network management procedure according to another example of the second embodiment of the invention. In this example, the reporting STA receives continuously another event request frame not including the event request field and including the event count field in the course of processing the previously received event request frame.

Referring to FIG. 16 the requesting STA transmits a first event request frame to the reporting STA (S410). The first event request frame includes one or more event request elements. The reporting STA having received the first event request frame starts processing the first event request frame (first process) (S415). The reporting STA receives a second event request frame from the same requesting STA in the course of processing the first event request frame (S420). In this example, it is assumed that the second event request frame does not include the event request field and includes the event count field. Then, the reporting STA recognizes the second event request frame not including the event request field as a command for stopping the process of the first event request frame and stops the processing of the first event request frame. When confirming that the second event request frame includes the event count field, the reporting STA starts processing the second event request frame (second process) (S425). Since the second event request frame does not include the event request frame but includes the event count field, the reporting STA contains the latest event report corresponding to the event type of the second event request frame in a second event report frame as many as included in the count field. Subsequently, the reporting STA transmits the second event report frame to the requesting STA (S430).

In this example, when receiving a subsequent event request frame not including an event request field but including an event count field before the event report for the previously received event request is completed, the reporting STA stops the response to the previous request, and transmits to the requesting STA an event report frame including the latest event report elements by the number of event count fields for the later requested event type.

The embodiments described above in detail are only examples explaining the technical spirit of the invention and it should be understood that the technical spirit is not limited to the embodiments. The scope of the invention is defined by the appended claims.

The embodiments described above in detail are only examples explaining the technical spirit of the invention and it should be understood that the technical spirit is not limited to the embodiments. The scope of the invention is defined by the appended claims.

Industrial Applicability

The invention relates to networking associated with wireless communication technologies, communication protocols, and communication procedures in wireless communication systems and can be applied to construction of wireless communication systems and manufacturing of equipments or stations (including wireless stations and base stations) constituting the wireless communication systems. Particularly, the invention can be applied to a management procedure in wireless communication systems.

The invention claimed is:

1. A method for performing an event reporting service by a wireless station in a wireless local area network system, the method comprising:

transmitting, by the wireless station to an access point (AP), an association request frame for requesting association with the AP, the association request frame including capability information indicating that the wireless station supports the event reporting service;

receiving, from the AP by the wireless station in response to the association request frame, a second wireless frame including an association response frame including capability information indicating that the AP supports the event reporting service;

logging, by the wireless station, at least one event for the event reporting service based on the association response frame;

receiving, by the wireless station from the AP, a third wireless frame including an event request frame including a category field followed by an action field followed by a dialog token field followed by an event request element field, wherein the event request element field including an event type field followed by an event response limit field, the event type field indicates an event type that is requested to be reported, and the event response limit field indicates an event response limit that is associated with a maximum number of logged events included in an individual event response frame;

transmitting, to the AP by the wireless station in response to receiving the event request frame, a fourth wireless frame including an event response frame including an event report element including at least one logged event selected according to the event type and the event response limit, wherein the event report element is a most recent event corresponding to the event type; and if the event report element does not fit into a single Medium Access Control Management Protocol Data Unit (MMPDU), transmitting, by the wireless station to the AP, at least one additional wireless frame including a remaining event report element.

2. The method of claim 1, wherein:
the event type that is requested to be reported is at least a transition, a Robust Security Network Association (RSNA), or a peer-to-peer link.

3. The method of claim 1, wherein a destination address field of the event request frame is set to a Medium Access Control (MAC) address of the wireless station within a Basic Service Set (BSS) associated with the AP.

4. A method for performing event reporting service via an access point (AP) in a wireless local area network system, the method comprising:

receiving, by the AP from a wireless station, a first wireless frame including an association request frame for requesting association with the AP, the association request frame including capability information indicating that the wireless station supports the event reporting service;

transmitting, to the wireless station by the AP in response to receiving the association request frame, a second wireless frame including an association response frame including capability information indicating that the AP supports the event reporting service and initiating a logging of at least one event for the event reporting service by the wireless station;

transmitting, by the AP to the wireless station, a third wireless frame including an event request frame including a category field followed by an action field followed by a dialog token field followed by an event request element field, wherein the event request element field including an event type field followed by an event response limit field, the event type field indicates an event type that is requested to be reported, and the event response limit field indicates an event response limit that is associated with a maximum number of logged events included in an individual event response frame;

receiving, from the wireless station by the AP in response to the event request frame, a fourth wireless frame including an event response frame including an event report element including at least one logged event selected according to the event type and the event response limit, wherein the event report element is a most recent event corresponding to the event type; and if the event report element does not fit into a single Medium Access Control Management Protocol Data Unit (MMPDU), receiving, by the AP from the wireless station, at least one additional wireless frame including a remaining event report element.

5. The method of claim 4, wherein:
the event type that is requested to be reported is at least a transition, a Robust Security Network Association (RSNA), or a peer-to-peer link.

6. The method of claim 4, wherein a destination address field of the event request frame is set to a Medium Access Control (MAC) address of the wireless station within a Basic Service Set (BSS) associated with the AP.

7. A wireless station for supporting an event reporting service in a wireless local area network system, the wireless station comprising:

a transceiver configured to transmit and receive signals; and a processor configured to:
transmit to an access point (AP) a first wireless frame including an association request frame for requesting association with the AP, the association request frame including capability information indicating that the wireless station supports the event reporting service;

receive, from the AP in response to the association request frame, a second wireless frame including an association response frame including capability information indicating that the AP supports the event reporting service;

log at least one event for the event reporting service based on the association response frame;

receive from the AP a third wireless frame including an event request frame including a category field followed by an action field followed by a dialog token field followed by an event request element field, wherein the event request element field including an event type field followed by an event response limit field, the event type field indicates an event type that is requested to be reported, and the event response limit field indicates an event response limit that is associated with a maximum number of logged events included in an individual event response frame;

transmit to the AP in response to receiving the event request frame, a fourth wireless frame including an event response frame including an event report element including at least one logged event selected according to the event type and the event response limit, wherein the event report element is a most recent event corresponding to the vent type; and if the event report element does not fit into a single Medium Access Control Management Protocol Data Unit (MMPDU), transmit to the AP at least one additional wireless frame including a remaining event report element.

* * * * *